(12) United States Patent
Dukart

(10) Patent No.: US 7,069,796 B2
(45) Date of Patent: Jul. 4, 2006

(54) DYNAMOMETER, PARTICULARLY FOR DETERMINING THE SEATING WEIGHT IN A MOTOR VEHICLE

(75) Inventor: Anton Dukart, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/499,049

(22) PCT Filed: Oct. 6, 2003

(86) PCT No.: PCT/DE03/03302

§ 371 (c)(1),
(2), (4) Date: Jun. 16, 2004

(87) PCT Pub. No.: WO2004/043746

PCT Pub. Date: May 27, 2004

(65) Prior Publication Data
US 2005/0103128 A1  May 19, 2005

(30) Foreign Application Priority Data
Nov. 11, 2002 (DE) ............................. 102 52 224

(51) Int. Cl.
*G01L 1/12* (2006.01)
(52) U.S. Cl. ................................................. 73/862.69
(58) Field of Classification Search ................... 73/779, 73/862.69
See application file for complete search history.

(56) References Cited

U.S. PATENT DOCUMENTS

| 5,739,757 | A |   | 4/1998 | Gioutsos |
| 6,129,168 | A |   | 10/2000 | Lotito et al. |
| 6,636,793 | B1 | * | 10/2003 | Garber et al. .................. 701/45 |
| 6,865,961 | B1 | * | 3/2005 | Wolf et al. ............... 73/862.69 |

FOREIGN PATENT DOCUMENTS

| DE | 102 16 723 | 10/2003 |
| WO | 00 16054 A | 3/2000 |

* cited by examiner

*Primary Examiner*—Max Noori
(74) *Attorney, Agent, or Firm*—Michael J. Striker

(57) ABSTRACT

A dynamometer (10; 10*a*; 10*b*) has a pickup element (11; 11*a*; 11*b*), in which a permanent magnet (32) and a sensor (35) are disposed. At least the permanent magnet (32) is surrounded by ferromagnetic material, and the spacing of the permanent magnet (32) from the ferromagnetic material changes upon imposition of a force (F) upon the pickup element (11; 11*a*; 11*b*). This change in the spacing causes a change in the field intensity of the permanent magnet (32), which is detected by means of the sensor (35) and converted into a corresponding signal.

10 Claims, 2 Drawing Sheets

DYNAMOMETER, PARTICULARLY FOR DETERMINING THE SEATING WEIGHT IN A MOTOR VEHICLE

STATE OF THE ART

Figure 1:
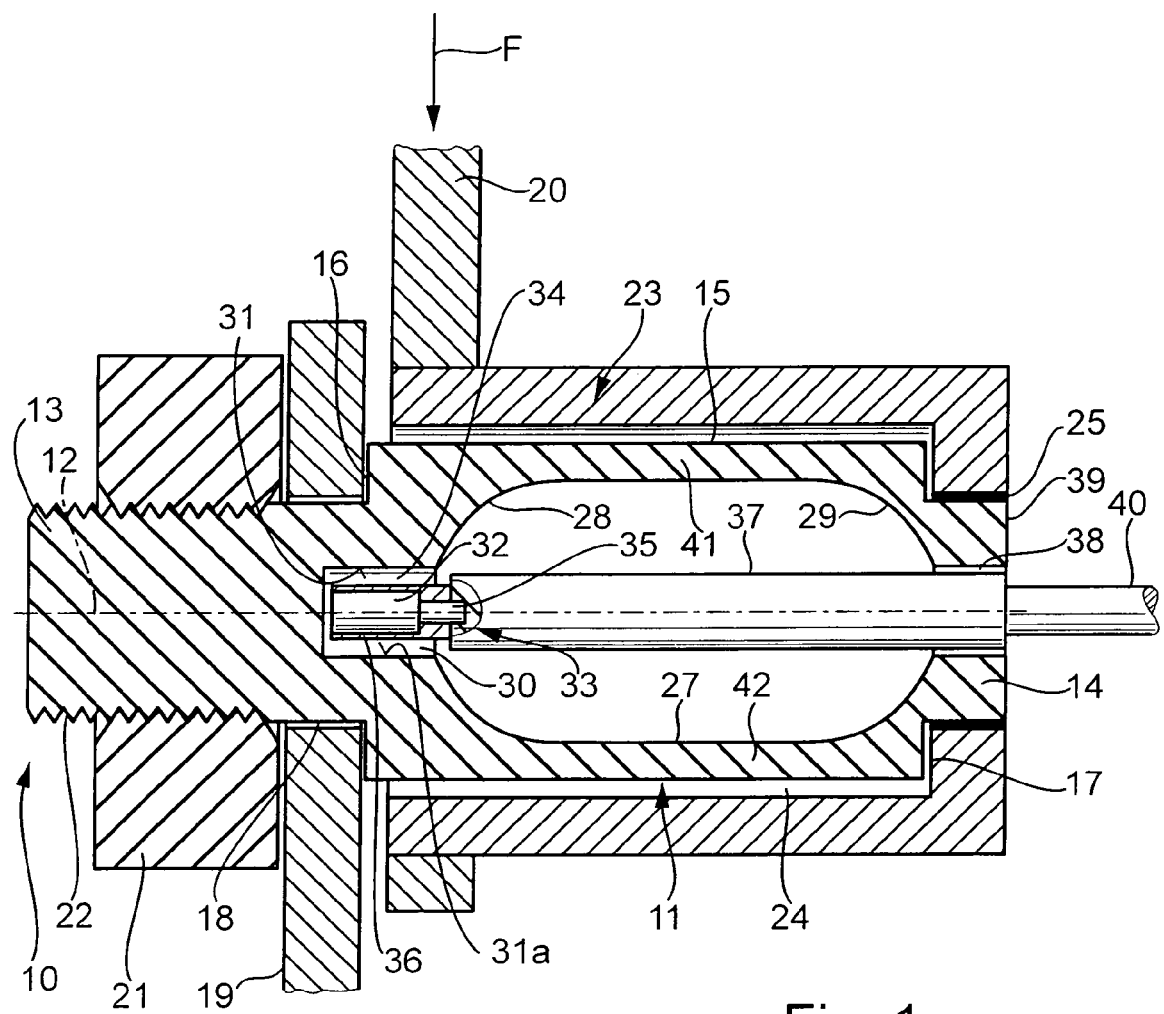

The invention relates to a dynamometer, in particular for determining the weight on a seat of a motor vehicle, of claim 1.

In a dynamometer known from German Patent Disclosure DE 102 16 723 A1, which had not been published by the priority date of the present application, the measurement array with its magnet plunges into an opening, embodied as a hole, in the pickup element. Since the spacing of the magnet from the ferromagnetic material is thus equal to all sides, even forces that are introduced into the pickup element perpendicular to the plane of the weight on the seat are detected by the measurement array. Such forces typically occur as a result of acceleration or deceleration of the motor vehicle. Conversely, what is desirable is to detect forces introduced into the pickup element solely in the plane of the weight on the seat.

It is also known from International Patent Disclosure WO 00/16054 to support the pickup element by positive engagement in the seat frame relative to forces introduced horizontally into the seat, so that the pickup element is deformed only in the direction of the weight on a seat. This mechanical prevention of transverse deformation of the pickup element, however, requires a special geometry in terms of the pickup element and its support in the seat frame.

ADVANTAGES OF THE INVENTION

The dynamometer of the invention, in particular for determining the weight on a seat in a motor vehicle, having the definitive characteristics of claim 1 has the advantage over the prior art that any deformation of the pickup element in the horizontal direction, that is, perpendicular to the weight on a seat, does not lead to any substantial change in the magnetic field of the magnet detected by the measurement array and is thus not detected; the pickup element and its receptacle are embodied relatively simply in the seat rail. This is accomplished by disposing the magnet in an elongated recess; the longitudinal axis of the elongated recess extends in the direction of the seat weight force exerted. As a result, upon a deformation of the pickup element perpendicular to the weight on a seat, the magnet is deflected parallel in the recess, without a resultant change in its spacing from the ferromagnetic material that would otherwise cause a change in the magnetic field. Conversely, a deflection of the magnet perpendicular to the longitudinal axis of the recess as a result of the weight on a seat directly causes a change in the spacing from the ferromagnetic material and thus a change in the magnetic field, and this change is detected.

Advantageous refinements of the dynamometer of the invention, in particular for determining the weight on a seat in a motor vehicle, are recited in the dependent claims.

In a preferred embodiment of the invention, the elongated recess is embodied as a slot, and as a result the recess can be produced especially simply.

In a further preferred embodiment of the invention, between the pickup element and the bearing element surrounding it a spacing is selected such that the deformation of the pickup element is limited, so as to protect the pickup element against an overload on the one hand and on the other, in the event of breakage of the pickup element, to assure securing of the seat to the seat rail.

Moreover, as a result of a special disposition of the poles of the magnet in the recess, the sensitivity of the measurement array with respect to the seat forces can be increased.

DRAWING

Figure 2:
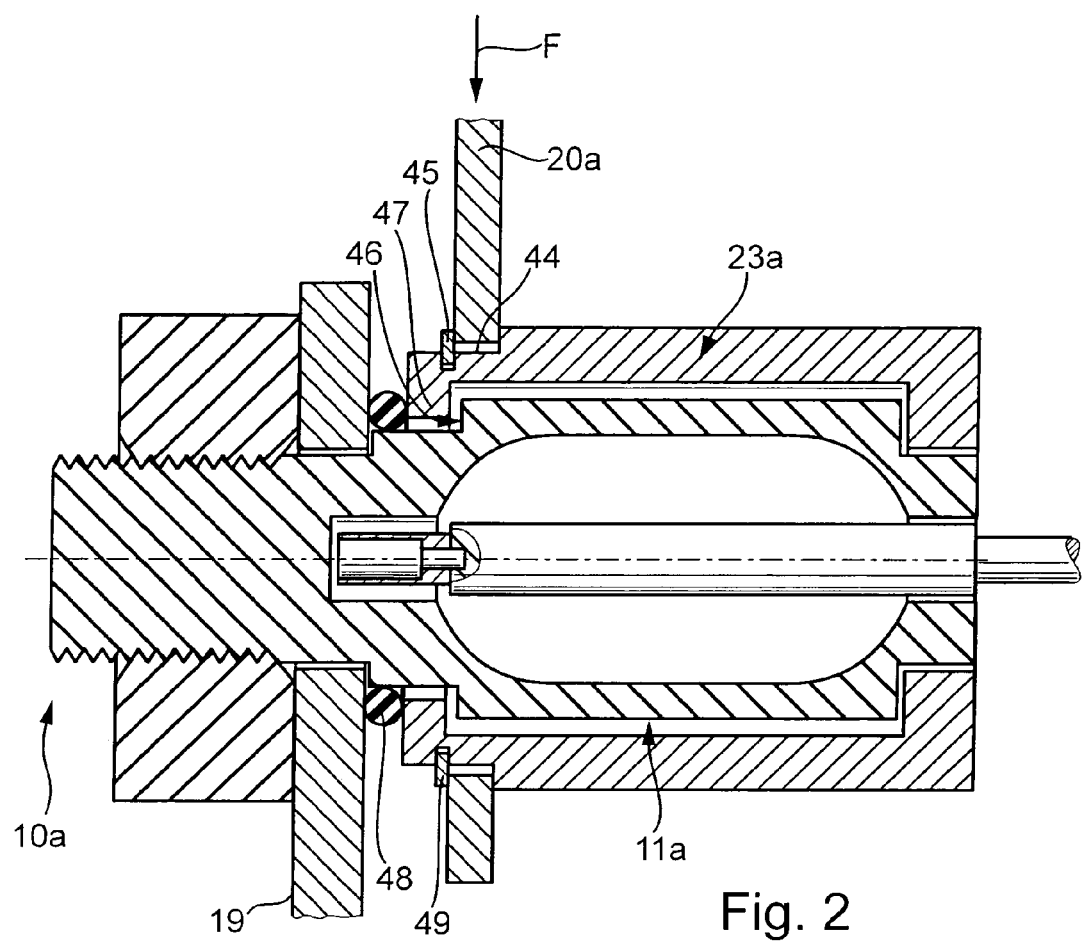

Exemplary embodiments of the invention are shown in the drawing and will be described in further detail below. Shown are:

FIG. 1, a first dynamometer of the invention in a simplified longitudinal section;

FIG. 2, a second, modified dynamometer, again in longitudinal section; and

Figure 3:
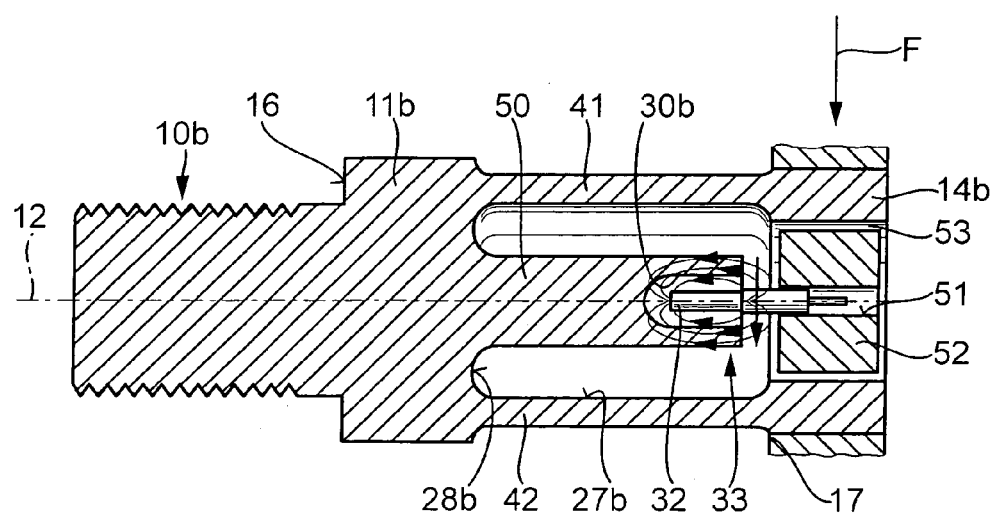

FIG. 3, a part of a third dynamometer in a longitudinal section.

DESCRIPTION OF THE EXEMPLARY EMBODIMENTS

The first dynamometer 10 shown in FIG. 1 serves to determine the weight on a seat in a motor vehicle. Determining the weight on a seat is necessary in modern motor vehicles, so that the course of the seat belt force over time and tripping of the air bag in an accident can be controlled as needed.

The dynamometer 10 has a pickup element 11 with a longitudinal axis 12. The pickup element 11, comprising ferromagnetic material, has one rotationally symmetrical end portion 13, 14 on each of its opposite sides, and these end portions have a diameter that is reduced compared to a middle portion 15. Between each end portion 13, 14 and the middle portion 15, there is a respective collar 16, 17, which serves as a stop in the direction of the longitudinal axis 12.

The pickup element 11 can be introduced by one end portion 13 into a hole 18 in a seat rail 19, which rail serves as a stationary bearing. The pickup element 11 can be fixed rigidly to the seat rail 19 by means of a nut 21, which cooperates with a thread 22 on the end portion 13. A rigid, cup-shaped bearing body 23 can be slipped onto the other end portion 14 of the pickup element 11 and fixed and is connected to a rocker 20, which in turn is a component of a seat, not shown, of the motor vehicle. Between the bearing body 23 and the pickup element 11, a connection exists only in the region of the end portion 14, for instance by means of an encompassing weld seam connection 25, while between the bearing body 23 and the middle portion 15 of the pickup element 11, there is always a gap 24.

A seat force F to be measured is thus transmitted, via the rocker 20 and the bearing body 23, into the end portion 14 of the pickup element 11, whereupon the pickup element deforms elastically because it is supported on only one side in the rail 19.

The magnitude of the deformation of the pickup element 11 in response to the force F is dependent on the spacing of the between the rail 19 and the fastening of the bearing body 23 to the pickup element 11 in the region of the weld seam connection 25; the seat force F acts as a bending force on the pickup element 11.

In the pickup element 11, a first recess is embodied in the form of an opening 27, which is located approximately in the middle portion 15. The opening 27 is created in particular by milling, and to reduce notch effects upon loading by the force F, it has rounded inner walls 28, 29 in the region of the sides oriented toward the end portions 13, 14. A second recess begins at the bottom of the inner wall 28 oriented toward the seat rail 19. The second recess has an elongated shape, such that its longitudinal axis extends perpendicular to the plane of the drawing in FIG. 1. Preferably, the second recess is embodied as a continuous slot 30 whose primary longitudinal direction is perpendicular to the plane of the drawing in FIG. 1.

At least the permanent magnet 32 of a sensor array 33 protrudes into the slot 30 with a slight gap 34 from the upper and lower walls 31, 31a of the slot 30. The sensor array 33 includes, besides the permanent magnet 32, a magnetic-field-sensitive sensor 35, which is preferably embodied as a Hall IC. The permanent magnet 32 and the sensor 35 are disposed stationary to one another on a carrier 36; the pole axis of the permanent magnet 32 preferably extends perpendicular to the longitudinal axis 12 of the pickup element 11, or in other words in alignment with the seat force F. The carrier 36 is secured to a plug-in bush 37, which in turn protrudes through a through hole 38 on the face end 39 of the pickup element 11 and is rigidly coupled there to the pickup element 11. The embodiment as the plug- in bush 37 makes the electrical contacting of the sensor array 33 possible, by means of a cable 40 through the inner wall of the plug-in bush 37.

As a result of the described embodiment of the pickup element 11 with its opening 27, two connecting ribs 41, 42 are embodied parallel to the longitudinal axis 12, which in the plane of the drawing of FIG. 1 are relatively narrow but perpendicular to the plane of the drawing are relatively wide, so that upon an introduction of the force F, the pickup element 11 deforms in the form of a double bending bar. This has the advantage that forces F caused purely by a seat force bring about a relatively major deformation or deflection of the pickup element 11. By comparison, forces that are introduced into the pickup element 11 perpendicular to the plane of the drawing in FIG. 1 (such as forces of acceleration or deceleration of the motor vehicle) cause only a relatively slight deformation of the pickup element 11, because of the relatively wide connecting ribs 41, 42 perpendicular to the plane of the drawing in FIG. 1.

It is essential that the plug-in bush 37 not participate in the deformation of the bearing body 11. Instead, the plug-in bush 37 is moved out of its position of repose, out of the longitudinal axis 12. Upon a force F, which as shown in the drawing extends perpendicular to the length of the gap 30, the gap 34 of the permanent magnet 32 from the walls 31, 31a of the slot 30 thus changes. Because of the change in the gap 34, the field intensity of the magnetic field lines of the permanent magnet 32 increases in the direction of the smaller gap 34 and decreases in the direction of the larger gap 34. These changes in the field intensities are detected by the sensor 35 and converted, by means of an evaluation circuit, into a signal for a corresponding seat force F.

By comparison, a force F which is introduced into the pickup element 11 perpendicular to the plane of the drawing in FIG. 1 causes only a deflection of the permanent magnet 32 perpendicular to the plane of the drawing in FIG. 1, so that the spacing of the permanent magnet 32 from the walls 31, 31a, and hence the field intensities as well, do not change.

In the second exemplary embodiment of the invention shown in FIG. 2, the dynamometer 10a, compared to the dynamometer 10, has a modified pickup element 11a and a modified bearing body 23a. It can be seen that the rocker 20a is joined to the bearing body 23a via a shoulder 44 and by means of a securing ring 45. A step 46 is also embodied on the pickup element 11a, on the side toward the seat rail 19. The step 46 is encompassed by a radially inward-protruding encompassing portion 47 of the bearing body 23a, and an O-ring 48 is also disposed between the portion 47 and the seat rail 19. A defined radial gap 49 is embodied between the inner circumference of the portion 47 and the pickup element 11a. If the pickup element 11a is subjected to a force F which is greater than a defined allowable force (in accordance with which the radial gap 49 is designed), the portion 47 seats itself directly with its inner circumference on the pickup element 11a, with the effect that the pickup element 11a does not deform further. The embodiment of the bearing body 23a with its portion 47 thus accomplishes protection against an overload. If the pickup element 11a should break outside the step 46, the embodiment also brings about a positive engagement between the bearing body 23a and the pickup element 11a.

In the third exemplary embodiment of the invention shown in FIG. 3, the dynamometer 10b has a pickup element 11b. This pickup element 11b differs from the pickup element 11 essentially in a pinlike extension 50, made of ferromagnetic material, which is disposed in the opening 27b. The extension 50, which is for instance form integrally on the pickup element 11b, begins at the inner wall 28b on the side toward the seat rail 19. The extension 50, which does not participate in the deformation of the pickup element 11b when the latter is subjected to a force F, has the second recess, in the form of the slot 30b, on its free end. The extension 50, or slot 30b, protrudes to near one end portion 14b, so as to attain the greatest possible deflection upon the deformation of the pickup element 11b. The permanent magnet 32 of the sensor array 33 protrudes into the slot 30b, and this sensor array is disposed in the through bore 51 in an annular carrier 52; the carrier 52 in turn is inserted into a through bore 53 in the end portion 14b. Moreover, the pole axis of the permanent magnet 32 in this exemplary embodiment extends in the longitudinal axis 12.

It will also be noted that the cross-sectional area of the bearing body 23, 23a and of the pickup element 11, 11a, 11b may be embodied not only in circular form but also for instance in square or oval form. Thus in a simple way, different load stops (depending on the dynamometer 11a) and optionally different resistance moments in the various load directions can be realized. It is furthermore understood to be possible for characteristics of various exemplary embodiments to be combined with one another. Hence the invention is not limited to the individual embodiments shown; on the contrary, combinations of the embodiments described are also conceivable.

The invention claimed is:

1. A dynamometer (10; 10a; 10b), in particular for determining the weight on a seat in a motor vehicle, having a pickup element (11; 11a; 11b), which has two bearing points (16, 17) spaced apart from one another, having a recess (27; 27a; 27b) in the pickup element (11; 11a; 11b) in the region between the two bearing points (16, 17), having a rodlike element (37; 50) not subjected to bending forces, whose free end, when a load is exerted on the pickup element (11; 11a;11b), is deflected by a force (F) to be measured, and having a measurement array (33) for detecting the deflection of the free end of the rodlike element (37; 50), wherein the measurement array (33) includes a magnet (32) and a magnetic-field-sensitive sensor (35), wherein the magnet (32) and the magnetic-field-sensitive sensor (35) are disposed stationary relative to one another, and wherein the magnet (32) is spaced closely apart from ferromagnetic material, characterized in that the magnet (32) is disposed inside an elongated recess (30; 30a; 30b) of the ferromagnetic material; and that the longitudinal axis of the recess (30; 30*a*; 30*b*) extends transversely to the direction of the force (f) to be measured and to the length of the rodlike element (37; 50).

2. The dynamometer of claim 1, characterized in that the elongated recess is embodied as a slot (30; 30*a*; 30*b*).

3. The dynamometer of claim 1, characterized in that the recess (30*b*) is embodied in an extension (50) which protrudes into the recess (27*b*).

4. The dynamometer of claim 1, characterized in that the recess (30*a*; 30*b*) begins at the bottom of the first element (27; 27*a*) in the pickup element (11; 11*a*).

5. The dynamometer of claim 1, characterized in that the pickup element (11; 11*a*; 11*b*) is embodied as a double bending bar, with two rodlike bars (41, 42) disposed parallel to one another; and that the rodlike element (37; 50) is disposed in the longitudinal axis (12) of the pickup element (11; 11*a*; 11*b*).

6. The dynamometer of claim 1, characterized in that the pickup element (11; 11*a*; 11*b*) is surrounded by a cup-shaped bearing element (23; 23*a*), which is coupled with the rocker (20; 20*a*) of a seat; that the force (F) to be measured is introduced via the bearing element (23; 23*a*); and that the pickup element (11; 11*a*; 11*b*) is connected on the one hand to a seat rail (19), as the first bearing point, and to the bearing element (23; 23*a*) on the opposite side, as the second bearing point.

7. The dynamometer of claim 6, characterized in that between the bearing element (23*a*) and the pickup element (11*a*) on the side toward the seat rail (19), a gap (49) is embodied which, if a defined allowable force (F) is exceeded, has the effect that the bearing element (23*a*) is seated on the pickup element (11*a*) and thus forms an overload stop.

8. The dynamometer of claim 6, characterized in that the bearing element (23; 23*a*; 23*b*) has a round, square or oval cross-sectional area.

9. The dynamometer of claim 6, characterized in that the bearing element (23*a*), on the side toward the seat rail (19), has an inward-protruding bearing collar (47), which engages a shoulder (46) of the pickup element (11*a*) from behind.

10. The dynamometer of claim 1, characterized in that the pole axis of the magnet (32) extends parallel to the direction of the force (F) to be measured.

\* \* \* \* \*